United States Patent

[11] 3,614,263

| [72] | Inventor | Max E. Witt<br>803 North Renville, Winthrop, Minn. 55396 |
|---|---|---|
| [21] | Appl. No. | 8,324 |
| [22] | Filed | Feb. 3, 1970 |
| [45] | Patented | Oct. 19, 1971 |

[54] CHLORINATION CONTROL APPARATUS
8 Claims, 7 Drawing Figs.

[52] U.S. Cl. ...................................................... 417/7,
137/88, 137/209, 417/426
[51] Int. Cl. ............................................................ F04b 41/06
[50] Field of Search ............................................ 417/7, 5, 6,
426, 137, 3; 137/88, 209

[56] References Cited
UNITED STATES PATENTS

| 2,136,776 | 11/1938 | Pugatz ........................... | 417/17 |
| 2,909,187 | 10/1959 | Gillooly ......................... | 137/209 |

*Primary Examiner*—Carlton R. Croyle
*Assistant Examiner*—Richard J. Sher
*Attorney*—Merchant & Gould ABSTRACT: Apparatus for selectively controlling the injection of chlorine into a water pressure tank utilizing a mercury switch actuated by a Bourdon tube for commencing and terminating the chlorine injection at pressures which are correspondingly greater than and less than the pressures at which the water flow into the pressure tank commences and terminates.

PATENTED OCT 19 1971 3,614,263
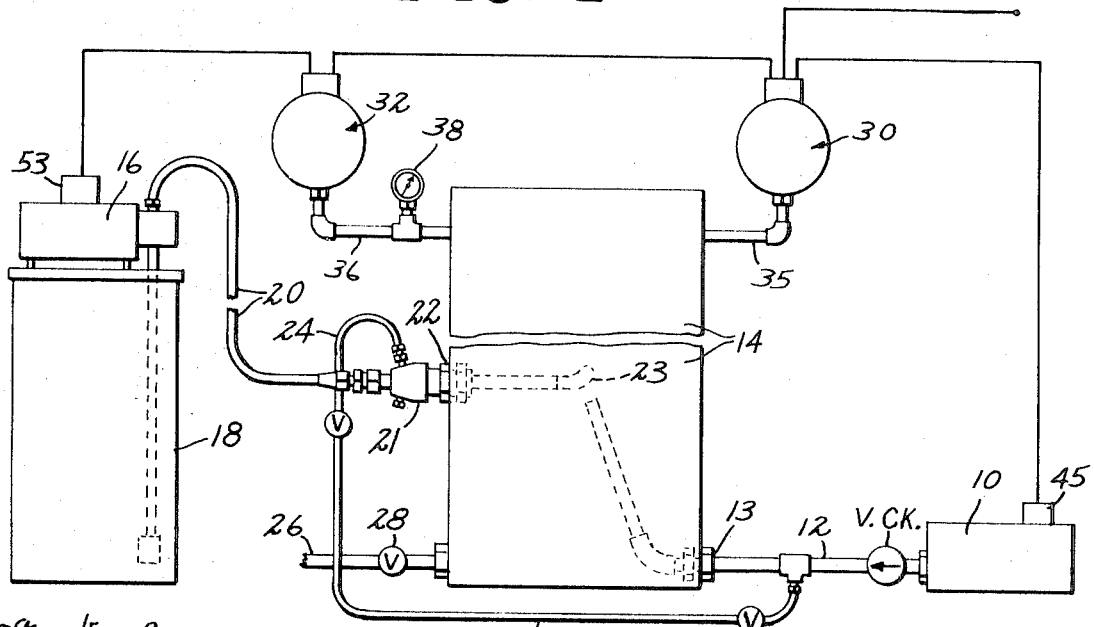
FIG. 1
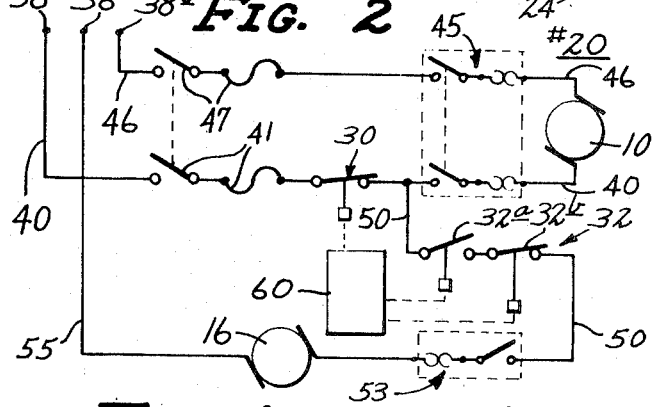
FIG. 2
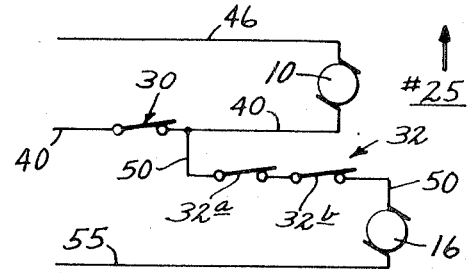
FIG. 3
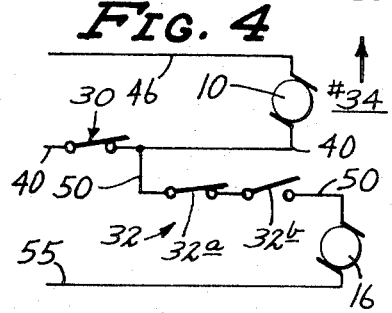
FIG. 4
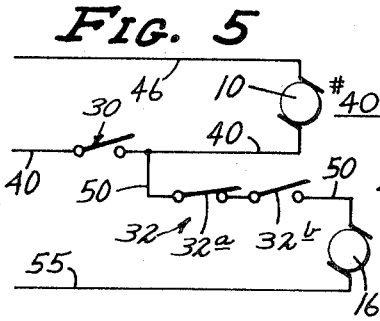
FIG. 5
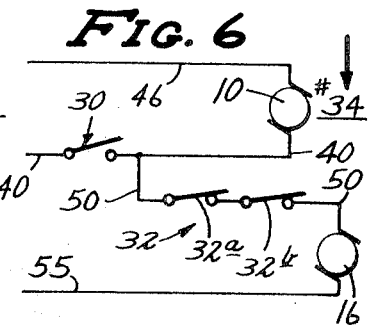
FIG. 6
FIG. 7
INVENTOR.
MAX E. WITT
BY
Merchant & Gould
ATTORNEYS 3,614,263

CHLORINATION CONTROL APPARATUS

BACKGROUND OF THE INVENTION

The present invention relates to apparatus for controlling the introduction of a material into a liquid and particularly to apparatus including a Bourdon tube actuated mercury switch for selectively controlling the amount of chlorine injected into a water pressure tank.

At the present time, various types of apparatus are commonly used to introduce medicants and the like into a water system. For instance, apparatus for injecting chlorine into private water systems is frequently used in areas in which there is not a public chlorinated water supply, such as in rural farm areas. The utilization of chlorinated water is beneficial to humans and to farm animals of all types. By way of example, the advantages obtained by utilizing a chlorinated water supply for farm animals, such as poultry, includes (1) increased resistance to secondary disease by protecting the animals from water borne primary diseases; (2) the elimination of the need to daily clean and disinfect the waters; (3) the reduction of equipment corrosion and staining; and (4) the elimination of virus, bacterial iron, slime, algae, and molds that cause disease and sticking valves.

The above-mentioned advantages can normally be provided by a chlorine-to-water concentration of approximately 1 to 1½ parts per million at the outlet or consumption end of the water supply system. However, in some cases it may be necessary to increase the chlorine concentration to 2–4 parts per million, or possibly higher, to achieve the desired purpose such as, for example, preventing cross-contamination of farm animals of which only some are diseased. If the amount of chlorine injected is not properly controlled, however, the chlorine concentration frequently reaches undesirably high concentrations (e.g., 5–15 or higher parts per million), resulting in what is commonly referred to as superchlorination. When superchlorination occurs, the water is distasteful to the farm animals (as well as humans) and their water consumption greatly decreases resulting in lower productivity and numerous health problems.

Generally, the prior art provides for the injection of chlorine into the water supply during the entire time period in which water is being pumped into the water pressure tank. After extended use, a conventional water pump commonly exhibits decreased pumping efficiency. Generally, the less efficient water pump labors particularly hard to provide the last few pounds of pressure increase within the pressure tank. As a result, an increasingly greater time period is required before the water pressure within the pressure tank reaches the shutoff pressure so as to deactuate the water and chlorine injection pumps. Consequently, a greater amount of chlorine is injected into the pressure tank than was the case when the water pump was operating more efficiently. This frequently results in superchlorination. Thus, it is desirable that apparatus be provided which permits the amount of chlorine injected to be maintained at a predetermined amount even after the chlorine injection and water supply apparatus has been used for extended periods of time. Such chlorination control apparatus will provide reliably disinfected water without the occurrence of superchlorination.

SUMMARY OF THE INVENTION

The present invention provides apparatus which allows selective control of the time span during which chlorine is injected into the water supply. This prevents the occurrence of undesirable superchlorination. Furthermore, the injection control apparatus provided by the present invention is dependable, economical, and long lasting.

To provide the above advantages, the present invention comprises an enclosed reservoir having one or more inlets therein and suitable for containing the liquid and injected material within a predetermined pressure range. Means connected to the inlet(s) are provided for introducing a material flow and a liquid flow into the reservoir. The introduction of a material (e.g., chlorine) into a liquid (e.g., water) is selectively controlled by pressure responsive control means associated with the reservoir. The pressure control means are operatively connected to both the liquid flow means and the material flow means for commencing and terminating the flow of the liquid when the pressure within the reservoir is equal to first and second pressures, respectively, and to commence the flow of the material when the pressure within the reservoir is at least equal to the first pressure and to terminate the material flow when the pressure within the reservoir is less than the second pressure.

By selectively controlling the pressure range within which the chlorine is injected into the water reservoir, the amount of chlorine injected into the water supply can be held nearly constant even after extended periods of injection. Normally, this amount is chosen so as to provide the advantages of chlorination without superchlorinating the water.

BRIEF DESCRIPTION OF THE DRAWING

FIG. 1 is a diagrammatic illustration of a chlorine injection system utilizing the injection control apparatus of the present invention;

FIG. 2 is a circuit diagram of the injection control apparatus in accordance with a preferred embodiment of the present invention; and FIGS. 3–7 are partial circuit diagrams illustrating the position of the pressure-responsive control switches at various rising and falling pressures within the pressure tank utilized in the present invention.

DETAILED DESCRIPTION OF THE PREFERRED EMBODIMENT

Referring now to FIG. 1, the chlorine injection system illustrated therein includes a liquid flow means comprising an electric motor and water pump combination 10 and a conduit 12. Motor and pump combination 10 is operatively associated with a water source (not shown) such as a well. Liquid or water conduit 12 is connected to a first inlet 13 in an enclosed reservoir or pressure tank 14. An electric motor and chlorine diaphragm pump combination 16 pumps chlorine from a chlorine reservoir or tank 18 through a chlorine feedline 20, a flush and injection block 21, a second inlet 22 in pressure tank 14 and a flexible injection nozzle 23 whereby the chlorine is injected into pressure tank 14. In the embodiment illustrated, conduit 12 is a 1½-inch (outer diameter) water feedline and chlorine feedline 20 has an outer diameter of three-eights inch. A conduit 24 connects water feedline 12 and flush and injection block 21 and provides a passage for a flow of water into block 21 to provide a flushing action in conduit 20, block 21 and injection nozzle 23. The water containing the injected chlorine is exhausted from pressure tank 14 through a distribution line 26 in response to the open or close position of a shutoff valve 28.

For a more complete description of the chlorine injection apparatus shown in FIG. 1 and particularly with respect to the design and operation of flush and injection block 21 and flexible injection nozzle 23, see my copending patent application Ser. No. 8,323. As described in my copending patent application, the chlorine can be alternatively injected into the water supply system by a direct injection of the chlorine into conduit 12 rather than into pressure tank 14. In this case, both the water and chlorine are then introduced into pressure tank 14 through the same inlet.

To control the amount of chlorine injected into the water supply system, the chlorine injection apparatus illustrated in FIG. 1 includes a pressure-responsive control means comprising a pair of differential pressure control switches 30 and 32 which are operatively connected to a pressure-responsive device (not shown) such as a Bourdon tube sensing element. Normally, the pressure-responsive device is positioned in the same housing as the associated pressure control switch. As illustrated, a conduit 35 connects differential pressure switch 30 and pressure tank 14. Likewise, pressure control switch 32 is connected to pressure tank 14 through a conduit 36. A conventional pressure gauge 38 is inserted in conduit 36 to allow a visual reading of the pressure within tank 14.

Differential pressure switch 30 is a single-pole mercury switch. Preferably, switch 30 has adjustable set points to permit adjustment of the pressure range in tank 14 during which switch 30 is closed. Pressure control switch 32 is preferably an adjustable differential, double-pole mercury switch. Switches 30 and 32 are of a conventional type well known in the art and can be readily purchased. For example, Dresser Industries, Inc. manufactures a series of mercury switches which will provide the desired circuit response in reaction to changes in pressure acting upon the Bourdon tube sensing element. Finally, differential pressure switches 30 and 32 can be operated separately by individual pressure-sensitive devices (e.g., separate Bourdon tubes) or they both can be operated by the same pressure-sensitive device. In the latter case, switches 30 and 32 are associated with the pressure-sensitive device (e.g., the mercury switch bottles are mounted on the Bourdon tube) so as to open and close in the desired sequence, thereby providing the mode of operation described hereinbelow.

As can be seen from FIG. 2, electric motor and water pump combination 10 is in an electrical circuit including a 240-volt power supply (not shown) which provides a 240-volt potential difference between terminals 38a and 38c. Further included in the same circuit is an electrical lead 40 having a fuse or circuit breaker 41 inserted therein, differential pressure switch 30, motor overload protection apparatus 45, and an electrical lead 46 having a fuse or circuit breaker 47 inserted therein and which provides a return path to the power supply. Likewise, chlorine diaphragm pump and electric motor combination 16 is in an electrical circuit comprising electrical lead 40, fused switch 41, differential pressure switch 30, an electrical lead 50, pressure control switch 32 having a first and second pole 32a and 32b, respectively, motor overload protection apparatus 53 and an electrical lead 55 which provides a return path to the power supply. Normally, a 120-volt potential, as provided between terminals 38a and 38b, is the required potential to operate electric motor and chlorine pump combination 16. Fused switches or circuit breakers 41 and 47 and motor overload protection apparatus 45 and 53 are of a conventional type and are chosen so as to prevent current overloading of motor and pump combinations 10 and 16.

Also diagrammatically illustrated in FIG. 2 is a pressure-sensitive device 60 which is responsive to pressure changes in pressure tank 14 and which sequentially controls the operation of switches 30 and 32. An example of one specific sequence of operation is described hereinbelow.

Commonly, the water supply system used in a private home operates over a water pressure range of 20–40 pounds per square inch. Consequently, the operation of the present invention is described in conjunction with such a water supply system. It should be understood, however, that the pressure range in which the water supply system operates is not critical for purposes of the present invention. Rather, it is the pressure range during which chlorine is being injected into the water supply system which is critical if the obtainment of reliably chlorinated water without superchlorination is desired. For the case in which the water supply system illustrated in FIG. 1 operates over a pressure range of 20–40 pounds per square inch, chlorine injection over a pressure range within tank 14 of 25–34 pounds per square inch will provide a chlorine concentration of 1 to 1½ parts per million.

The operation of the present invention can best be described in conjunction with reference to FIGS. 2–7.

As water containing the injected chlorine is withdrawn from pressure tank 14 through distribution line 26, the pressure within tank 14 decreases. Upon decreasing to a first pressure or low preset point of 20 pounds per square inch, pressure switch 30 closes and actuates motor and water pump combination 10. As a result, water is introduced into pressure tank 14 through conduit 12 raising the pressure within tank 14. However, as illustrated in FIG. 2, pole 32a is in an open position and, consequently, electric motor and chlorine pump combination 16 remains deactuated.

As the rising pressure in tank 14 reaches 25 pounds per square inch, pressure switch 32a closes and actuates electric motor and chlorine pump combination 16 as illustrated in FIG. 3. As the pressure continues to rise within pressure tank 14, it reaches (and passes through) 34 pounds per square inch. At this pressure, pressure switch 32b opens deactuating electric motor and chlorine pump combination 16. This point in the injection cycle is illustrated in FIG. 4. After deactuation of electric motor and chlorine pump combination 16, water pump 10 continues to pump water into pressure tank 14 until the high set point of 40 pounds per square inch is reached. At this pressure, pressure switch 30 opens, as illustrated in FIG. 5, and deactuates motor and water pump combination 10.

As water is exhausted from pressure tank 14, switch 32b closes, as illustrated in FIG. 6, when the falling pressure within the pressure tank 14 reaches 34 pounds per square inch. However, since switch 30 is open, electric motor and chlorine pump combination 16 is not actuated. As the pressure continues to decrease, switch 32a opens, as illustrated in FIG. 7, when the falling pressure reaches 25 pounds per square inch. The pressure in tank 14 continues to decrease until it reaches 20 pounds per square inch. At this pressure, switch 30 closes and the above-described chlorine injection cycle repeats.

From the above description, it can be seen that pole 32a is open whenever the pressure within tank 14 is less than 25 pounds per square inch. Likewise, pole 32b is open whenever the pressure in tank 14 is greater than 34 pounds per square inch. Consequently, chlorine is injected into the water supply system only when motor and water pump 10 are operating and a 25–34-pound pressure range prevails within tank 14. It is to be understood, however, that other pressure ranges (for example, a 15 pounds per square inch range) may be desirable. For example, when a chlorine injection system is installed into a water supply system having a great amount of accumulated iron, bacteria or other undesirable contaminants in the water, it will take an increased initial concentration of chlorine to provide the desired 1–1½ parts per million chlorine concentration at the outlet of the water supply system. Thus, in this instance, it will be desirable to initially adjust the pressure range or differential provided by pressure control switch 32 to a differential greater than 9 pounds per square inch.

From the above description, it should be apparent that the gist of the present invention is to provide pressure-responsive control means which regulates the amount of chlorine injected into a water supply system by injecting chlorine only when the pressure within the pressure tank utilized in the water supply is within a selected range. Preferably, the pressure range during which chlorine injection occurs has a minimum pressure near or equal to the low set point of pressure switch 30 and a maximum pressure which is normally substantially less (e.g., 5–10 pounds per square inch) than the high set point of pressure switch 30. The choice of an injection pressure range having a maximum pressure substantially less than the high set point of switch 30 minimizes the effect of the water pump becoming less efficient with extended use, since, as mentioned previously, the decreased efficiency of the pump will be exhibited primarily near the maximum pressure within tank 14; i.e., the high set point of pressure switch 30.

It will be apparent to those of ordinary skill in the art that numerous modifications can be made to the preferred embodiment described above. As one example, the present invention can be utilized in conjunction with an electric motor and water pump combination which requires only 120 volts for operation.

What is claimed is:

1. Apparatus for controlling the introduction of a material into a liquid wherein liquid and material flow means are connected to inlet means in an enclosed reservoir which is suitable for containing said liquid and said material within a pressure range having lower and upper limits defined by first and second pressures, respectively, comprising pressure-responsive control means associated with said reservoir and operatively connected to said liquid flow means and to said material flow means for commencing and terminating said liquid flow when said pressure within said reservoir is at said first and second pressures, respectively, and for commencing said material flow when said pressure is at least equal to said first pressure and terminating said material flow at a pressure less than said second pressure.

2. The apparatus of claim 1 wherein:
  a. said liquid flow means includes liquid pump means and a liquid conduit means having an inlet therein connected to said liquid pump means and outlet therein connected to said inlet means in said reservoir;
  b. said material flow means includes a material pump means and a material conduit means having an inlet therein connected to said material pump means and an outlet therein connected to said inlet means in said reservoir; and
  c. said pressure-responsive control means is operatively connected to said liquid pump means and to said material pump means.

3. The apparatus of claim 2 wherein:
  a. said inlet means in said enclosed reservoir includes an inlet opening therein;
  b. said liquid conduit means includes a second inlet therein, and said liquid conduit outlet is connected to said enclosed reservoir inlet; and
  c. said material conduit outlet is connected to said second inlet in said liquid conduit.

4. The apparatus of claim 2 wherein:
  a. said inlet means in said enclosed reservoir includes first and second inlet openings therein;
  b. said outlet in said liquid conduit is connected to said first reservoir inlet; and
  c. said outlet in said material conduit is connected to said second reservoir inlet.

5. The apparatus of claim 2 wherein:
  a. said liquid pump means includes an electric motor and liquid pump combination;
  b. said material pump means includes an electric motor and material pump combination; and
  c. said pressure control means includes pressure-sensitive means communicated with said reservoir and operatively connected to first and second electrical switch means, said first electrical switch means being electrically connected to said electric motor and liquid pump combination and said second electrical switch means being electrically connected to said electric motor and material pump combination.

6. The apparatus of claim 5 wherein:
  a. said first switch means is a single-pole differential pressure switch; and
  b. said second switch means is a double-pole differential pressure switch.

7. The apparatus of claim 6 wherein:
  a. said second switch is connected in series arrangement with said first switch and in parallel arrangement with said electric motor and liquid pump combination; and
  b. said first and second switches are mercury contact switches.

8. The apparatus of claim 7 wherein:
  a. said first switch closes and opens at substantially 20 and 40 pounds per square inch pressure, respectively, in said reservoir; and
  b. said first pole of said second switch closes at a rising pressure of substantially 25 pounds per square inch and opens at a falling pressure of substantially 25 pounds per square inch and said second pole of said second switch opens at a rising pressure of substantially 34 pounds per square inch and closes at a falling pressure of substantially 34 pounds per square inch.